3,271,383
DISAZO DYES CONTAINING AN N-SUBSTITUTED BENZOTHIAZOLYL GROUP
Wataru Yamaya, Kitakyushu-shi, Fukuoka-ken, and Kōji Matsui, Kiryu-shi, Gunma-ken, Japan, assignors to Mitsubishi Chemical Industries Limited, Tokyo, Japan
No Drawing. Filed June 11, 1963, Ser. No. 286,937
6 Claims. (Cl. 260—158)

The present invention relates to new cationic dyestuffs.
The present invention provides new valuable cationic dyestuffs suitable for colouring natural or synthetic fibrous materials and plastics, more particularly those of polyacrylonitrile type in various shades having excellent fastness to light and washing.
The present invention also provides methods of manufacturing the new cationic dyestuffs. Further, the present invention provides a method of colouring the aforementioned materials by the use of said new cationic dyestuffs.
The new cationic dyestuffs of the present invention are indicated by the general Formula 1:

$$D-Q-D' \qquad (1)$$

wherein D and D' each is same or different dyestuff residue free from sulphonic and carboxylic acid groups; any one of D and D' has at least one quaternary ammonium group, one quaternary nitrogen atom in said quaternary ammonium group being a member of a heterocyclic nucleus whilst the other has at least one primary- or secondary- or tertiary-amino group or quaternary ammonium group; and Q is a divalent linking group having no double or triple bond that is in conjugating relationship with double bonds in both D and D'.

D and D' in Formula 1 may be various dyestuff residues such as azo, azomethine, cyanine, polymethine type and anthraquinone dyestuff residue which are free from sulphonic and carboxylic acid groups. Any one of D and D' has at least one quaternary ammonium group, quaternary nitrogen atom in said quaternary ammonium group being a member of heterocyclic nucleus. The heterocyclic group containing quaternary ammonium group will hereinafter be referred to as cycloammonium group.

A typical example of the cycloammonium groups to be contained in both or one of D and D' is indicated by the following general Formula 2:

(2)

wherein Y denotes a divalent atom or radical, and n is zero or 1.

As the heterocyclic groups of this kind there may be cited N-substituted benzothiazolyl-2-groups, N-substituted thiazolyl-2-groups, N-substituted 1·2·4-triazolyl-3-groups, N-substituted pyridyl-2- or -4-groups, N-substituted quinolyl-2- or -4-groups, N-substituted imidazolyl-2-groups, N-substituted 1·3·5-triazinyl-2-groups, and/or 3·3-dialkyl-N-substituted indolyl-2-groups. These groups may further have substituents other than sulphonic or carboxylic acid groups.

Another typical example of the said cycloammonium groups is indicated by the following general Formula 3:

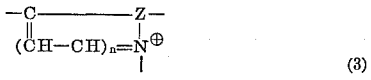
(3)

wherein Z denotes a trivalent group or atom, and n denotes zero or 1.

As the heterocyclic groups of this kind there may be cited N-substituted benzothiazolyl-5-groups, N-substituted thiazolyl-4- or -5-groups, N-substituted benzoimidazolyl-5-groups, imidazolyl-4- or -5-groups, N-substituted pyridyl or quinolyl groups, and/or 3·3'-dialkyl-N-substituted indolyl-4- or -5-groups. These groups may further have substituents other than sulphonic or carboxylic acid groups.

Examples of dyestuff residues D and D' having abovementioned heterocyclic radicals will be shown in examples set forth later.

The linking group Q of general Formula 1 may include, for example, straight chain and branched chain alkylene radicals, which may further have substituents such as hydroxyl or halogen. Q may also include a divalent group wherein two alkylene groups or more are combined together via oxygen or nitrogen and/or sulphur atoms. Still further, the linking group Q may be a divalent group composed either of carbonyl-, sulphonyl-, carbonylamino-, sulphonylamino-, arylene, alkenylene-, and —NR—NR'-groups, R and R' denoting hydrogen atom or lower alkyl group, and alkylene radical, or of a divalent radical comprising two aforesaid groups or more combined with alkylene radical.

A number of invaluable cationic dyestuffs are provided by appropriate selection and subsequent combination of dyestuff residues D and D'.

The novel cationic dyestuffs of the invention will be cited in the examples set forth later as embodiments of the invention.

The new cationic dyestuffs of general Formula 1 may be manufactured by the methods which will be illustrated as follows:

The first method comprises subjecting a dyestuff intermediate, which is indicated by Formula 4:

$$M-Q-M' \qquad (4)$$

wherein M and M' each denotes intermediate residue of dyestuff residues D and D' in aforementioned Formula 1, and Q is of the same significance as in Formula 1 to treatment by a suitable method employing another dyestuff intermediate so that intermediate residues M and M' are converted to dyestuff residues D auw D'. Among intermediate residues M and M' as indicated by Formula 4 there may be cited any aromatic radical that is capable of coupling with a diazo compound. M and M' may be aryl or heterocyclic group having such functional substituent as diazonium-, nitroso-, amino-, aldehyde-, and dihalogeno methyl-groups. Among intermediate residues M and M', there may also be cited heterocyclic hydrazone residue in which =N—NH$_2$ radical is combined with carbon atom of 2- or 4-position in relation to the nitrogen atom in heterocyclic nucleus. Linking group Q indicated in Formula 4 is capable of directly combining with the nucleus of intermediate residues M and M'. Also, linking group Q may combine indirectly with intermediate residues M and M' via carbon atom, or nitrogen atom, or oxygen atom, and/or sulphur atom. In some cases; linking group Q may combine with quaternized nitrogen atom in M or M'. Some examples of the intermediates indicated by Formula 4 which are capable of coupling with diazotized amines are shown in Table 1. None of these intermediates are known in the prior art.

TABLE 1

| | M-Q-M' | Melting or boiling point (uncorr.) |
|---|---|---|
| (1) | 3-CH₃-C₆H₄-NH-CH₂-CH₂-NH-C₆H₄-3-CH₃ | M.P. 54.5–55.5° C. |
| (2) | 4-Cl-C₆H₄-N(C₂H₄OH)-CH₂-CH₂-N(C₂H₄OH)-C₆H₄-4-Cl | M.P. 80.0–82.0° C. |
| (3) | C₆H₅-N(CH₂.CH(OH).CH₂OCH₃)-CH₂-CH₂-N(CH₂.CH(OH).CH₂OCH₃)-C₆H₅ | M.P. 83.0–84.0° C. |
| (4) | C₆H₅-N(C₂H₅)-CH₂-CH(OH)-CH₂-N(C₂H₅)-C₆H₅ | B.P. 220–240° C./8 mm. Hg. |
| (5) | C₆H₅-N(C₂H₅)-CH₂-C₆H₄-CH₂-N(C₂H₅)-C₆H₅ | M.P. 121.0–123.0° C. |
| (6) | C₆H₅-N(C₂H₅)-C₂H₄-O-C₂H₄-N(C₂H₅)-C₆H₅ | B.P. 214–216° C./3 mm. Hg. |
| (7) | C₆H₅-N(C₂H₅)-C₂H₄-O-CH₂-CH₂-O-C₂H₄-N(C₂H₅)-C₆H₅ | B.P. 236–240° C./3 mm. Hg. |
| (8) | C₆H₅-N(C₂H₅)-C₂H₄-N(4-CH₃-C₆H₄)-C₂H₄-N(C₂H₅)-C₆H₅ | M.P. 70.0–71.0° C. |
| (9) | C₆H₅-N(C₂H₅)-C₂H₄-N(4-NHCOCH₃-C₆H₄)-C₂H₄-N(C₂H₅)-C₆H₅ | M.P. 106.0–107.0° C. |
| (10) | C₆H₅-N(C₂H₅)-C₂H₄-N(CH₃)-CH₂.CH₂-N(CH₃)-C₂H₄-N(C₂H₅)-C₆H₅ | Oil: C, found 74.08%; C, calc. 75.34%. N, found 14.59%; N, calc. 14.65%. |
| (11) | C₆H₅-N(C₂H₅)-CH₂CH₂-N(C₂H₄OH)-C₆H₄-3-CH₃ | M.P. 118.0–120.0° C. |
| (12) | 3-CH₃-C₆H₄-N(piperazinyl: CH₂.CH₂/CH₂.CH₂)-N-C₆H₄-3-CH₃ | M.P. 124.0–125.0° C. |
| (13) | C₆H₅-N(C₂H₅)-C₂H₄-O-C₆H₄-4-N(C₂H₅)₂ | B.P. 220° C./7 mm Hg; 238° C./11 mm. Hg. |

The intermediate for dyestuffs indicated by Formula 4 may be converted to cationic dyestuffs by subjecting said intermediate to coupling or condensing in an optional order with other intermediate such as suitable diazo component, coupling component or hydrazones, aldehydes, and further to quaternization if required.

Other methods of manufacturing the new dyestuffs of the present invention comprises subjecting one dyestuff compound or more, including azo, cyanine, azomethine, polymethine, or anthraquinone dyestuff compound having neither sulphonic acid group nor carboxylic acid group to condensation with a linking agent indicated by the following Formula 5:

$$X-Q'-X' \quad (5)$$

wherein X and X' each denotes identical or different functional groups such as halogen atom, amino-, halogenoacyl-, hydroxy-groups and Q' denotes divalent radical being of the same significance as Q in Formula 1. The linking agents to be used in this method are, for example, alkylene or arylene dihalides, dihalides of dibasic acids, and halogenohydrins, etc. The condensation reaction may be carried out in an optional order. In case where substituted diamines or dihalides are employed as linking agent, simultaneous formation of cycloammonium group at one end or both ends of the linking agent together with linking (condensation) may be effected. If epihalogenohydrins are employed as linking agent, the linking agent is condensed with the first dyestuff component D, followed by condensation of the resulting condensate with the second dyestuff component D' to form aimed cationic dyestuffs of the invention. Further, it is also possible to form dyestuffs of the invention by allowing one dyestuff component and one intermediate component to combine in an optional order with aforementioned linking agent, followed by treatment of the resulting condensate with other suitable intermediate components so that intermediate residue in the condensate is converted to dyestuff residue. Alkylation or quaternization may be carried out in any stage of said manufacturing processes if desired.

The new dyestuffs of the invention are used for the colouration of various materials, including fibres, woven or knitted fabrics, plastics, and spinning bath. These dyestuffs are practically most useful for dyeing and printing of fibrous materials made of polyacrylonitrile or of copolymers comprising acrylonitrile and other vinyl compounds. Blended fibres and union fabrics which are composed of polyacrylonitrile type fibres and wool, silk, cellulosic fibres and/or various synthetic fibres are also suitably dyed by use of these novel dyestuffs. The present colouring method may be performed preferably in acidic or neutral aqueous medium. In some cases, inorganic or organic salts and/or such dyeing auxiliaries as retarder, swelling agents, thickeners may be employed.

Although the temperature at which colouring is effected is varied depending on the kind of dyestufs or material to be dyed, dyeing is started at a temperature in a range from room temperatures up to 60°C. finished at a temperature in a range from 90 to 100° C., as a rule, in order to effecting favorable level dyeing. In some cases, dyeing is effected under pressure at a temperature above 100° C.

In addition to the aforementioned method, there may be further cited a method of colouring which comprises adding dyestuffs to spinning bath containing organic high molecular weight substance adapted for dyeing, especially such polymer or copolymer that is based on acrylonitrile or dicyanoethylene, followed by spinning.

The employment of the dyestuffs of the invention in combination with the aforementioned dyeing methods affords colouring materials especially acrylic textile material in various hues with fastness to light and washing. The dyestuffs of the invention are especially suitable for dyeing and printing polyacrylonitrile fibres in fast dark shades such as navy blues, browns, olives, and blacks.

Some of the dyestuffs of the invention which contain nitrogen, sulphur, or oxygen atom in linking group Q give bright and pure shades to polyacrylonitrile fibres and allied fibrous materials and practically valuable because of their good dyeing properties such as excellent build up, leveling power, and overall fastness.

The dyestuffs claimed herein have the following structural formula:

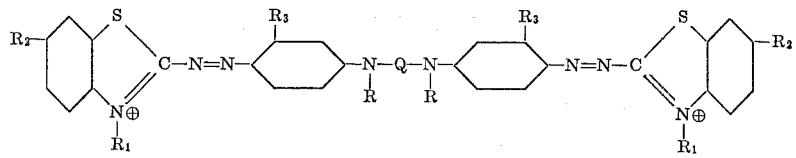

wherein R is methyl, ethyl, hydroxyethyl, hydroxypropyl, hydroxy-methoxy-propyl and hydrogen; $R_1$ is a radical taken from the class consisting of methyl; $R_2$ is a radical taken from the class consisting of hydrogen, methoxy, ethoxy, methyl, ethyl and chlorine; $R_3$ is a radical taken from the class consisting of hydrogen, methyl; and Q is a divalent radical taken from the class consisting of ethylene, propylene, oxydiethylene, dioxytriethylene, hydroxypropylene and p-toluidino-N, N-diethylene.

Some preferred embodiments of the invention will be described in detail wherein the examples given are for the purpose of illustrating preferred embodiments only and not for the purpose of limiting the same.

*Example I*

27.0 parts of 6-methoxy-2-amino-benzothiazol are dissolved in a mixture composed of 15 parts of 98% sulphuric acid, 7.5 parts of ice, and 40 parts of water and the resultant liquor is allowed while stirring to flow into 705 parts of 60% sulphuric acid. The suspension thus obtained is cooled to −10° to 15° C. to which is added under vigorous stirring nitrosyl sulphuric acid over two hours at a temperature from −10° to −15° C. which has been produced from 55 parts of concentric sulphuric acid and 10.4 parts of sodium nitrate, followed by stirring for 30 min. and discharging into ice water composed of 1,000 parts of water and 900 parts of ice. To this product then is added a solution produced by allowing 19.5 parts of N·N-bis(2 - N'-ethyl-N'-phenylamino ethyl)-p-toluidine manufactured as will be later described to dissolve in 90 parts of 15% sulphuric acid, followed by stirring for 2 hr. at a temperature in the neighbourhood of −10° C. and subsequent filtration to recover the precipitate which is washed and dried. The crude cake thus obtained is recrystallized, if desired, from chlorobenzene for refining to obtain disazo dyestuff compound having melting point from 228° to 229° C. (uncorrected value) as indicated by the following formula:

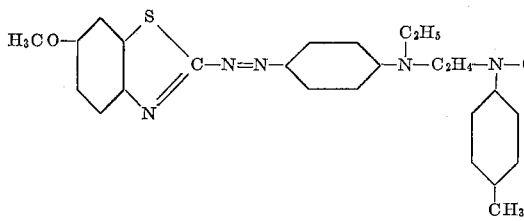

3.6 parts of disazo dyestuff compound thus obtained are added to 90 parts of chlorobenzene, heated up to 100° C.; stirred, subjected to an addition while stirring at the same temperature of 1.9 parts of dimethyl sulphate dissolved for 5 parts of chlorobenzene in 20 minutes, and further stirred for 3 hrs. at the same temperature. Upon completion of reaction, the liquor is cooled, subjected to filtration to remove chlorobenzene and to take out reaction products precipitated to which are added 300 parts of 1% acetic acid aqueous solution, heated for dissolution, followed by further addition of a small amount of active carbon and filtration. To the blue filtrate thus obtained is added sodium chloride in an amount accounting for 5 percent of the liquor, stirred for 1 hr., and cooled to precipitate the dyestuffs. The filtered cake is washed by 5% sodium chloride water, further refined if desired and dried.

The cationic dyestuff thus obtained is indicated by the formula below and indicates in methanol solution containing 0.1% acetic acid one maximum absorption wave length at about 570 mµ.

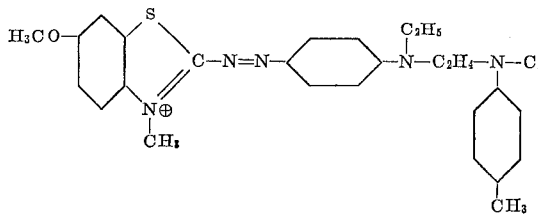

This dyestuff is readily dissolved in water and adapted to dyeing in a weak acidic aqueous solution thereof polyacrylonitrile fiber in clear blue having a slight reddish tint with remarkable fastness.

N·N - bis(2 - N' - ethyl - N' - phenylamino - ethyl)- p-toluidine employed as raw material in the above example is manufactured in the manner as described below:

38.5 parts of N-(2-chloroethyl)-N-ethyl aniline are mixed with 10.7 parts of p-toluidine and 80 parts of ethanol, and dissolved. To the resultant liquor added are 10.5 parts of calcium carbonate and 50 parts of water and boiled under reflux for 12 hours. The reaction liquor is subject to hot filtration to remove insoluble matter and cooled to cause crystallization. The crystallized matter is separated by filtration, allowed to recrystallize from alcohol to form needle-like crystals having a melting point of from 70° C. to 71° C. (uncorr.). The analytical value of this compound closely approximates as shown below the calculated value of N·N-bis(2-N'-ethyl-N'-phenylamino ethyl)-p-toluidine:

In re $C_{27}H_{35}N_3$—C, Calcd. 80.80%; Found, 80.25%. N, Calcd. 10.48%; Found, 10.45%.

Example 2

16.2 parts of 6-methoxy-2-amino-benzothiazol are dissolved in 34 parts of 25% sulphuric acid, and the resultant solution is poured while stirring into 380 parts of 60% sulphuric acid. The suspension thus obtained is cooled to —10° to 15° C. and is diazotized under vigorous stirring by the addition of nitrosyl sulphuric acid which has been produced from 55 parts of 98% sulphuric acid and 6.2 parts of sodium nitrate. The solution is further stirred for 60 minutes and is poured into the mixture of 750 parts of water and 550 parts of ice, after which excess nitrate is eliminated by the addition of sulfamic acid. To the solution thus obtained, there is added a solution of 11.0 parts of ethyleneglycol-bis-(2-N-ethyl-N-phenylamino ethyl) ether in 90 parts of 15% sulphuric acid, followed by stirring for 2 hours at a temperature of —5° to —10° C. The precipitate is then filtered and is washed thoroughly and dried. The crude cake is purified, if desired, and the cake so obtained has a following structure which melts at 166–167° C. (uncorr.).

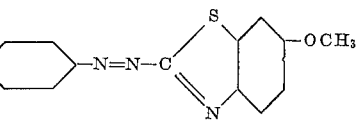

20 parts of disazo dyestuff intermediate obtained by the abovementioned method are added to 800 parts of chlorobenzene, and heated up to 110° C. To the solution thus obtained there is added while stirring 28 parts of dimethyl sulphate for 20 minutes, and the mixture stirred for further 2 hrs. at 110° C. The reaction mixture is cooled and filtered, and so obtained precipitate is dissolved in 4000 parts of hot water containing 1% acetic acid. The solution is then filtered, and resulted filtrate is salted out by the addition of 200 parts of sodium chloride and 51 parts of zinc chloride. Precipitated dyestuff is then filtered and the filter cake is washed by 5% sodium chloride water, further refined if desired, mixed with 1 part sodium bisulfate and dried at 60° C.

The cationic dyestuff thus obtained is indicated by the formula below and indicates in methanol solution containing 0.1% acetic acid maximum absorption wave length at about 567 mµ.

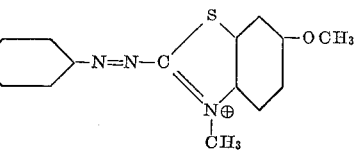

This dyestuff is readily dissolved in water and dyes polyacrylonitrile fibre in clear reddish blue shade fast to light and washing.

Ethyleneglycol - bis - (2 - N - ethyl - N - phenylamino ethyl) ether used in the above example is prepared in the manner as described below:

364 parts of N-ethyl-aniline are mixed with 187 parts of ethyleneglycol-bis-(2-chloroethyl) ether and 106 parts of sodium carbonate. The mixture is then heated to 125° C. for 1 hr. while stirring, and further stirred for 25 hrs. at 125–130° C. The reaction mixture is then poured into water, an oily layer is separated and is washed twice with water. The oil is then distilled under reduced pressure and the fraction of B.P. 238–240° C. at 3 mm. Hg is collected.

Example 3

7 parts of 3-amino-1·2·4-triazol are dissolved in a mixture of 100 parts of glacial acetic acid, 6 parts of sulphuric acid and 60 parts of water, diazotized at a temperature below 0° C. by use of nitrosyl sulphuric acid, which has been produced from 5 parts of sodium nitrite and 12 parts of 98% sulphuric acid, followed by an addition thereto of a liquor produced by way of dissolving 9.3 parts of bis(2-N-ethyl-N-phenylamino ethyl) ether, which has been produced as will be described later, in 30 parts of acetic acid for effecting coupling and stirring at the same temperature for 2 hours. Upon completion of the reaction, 50% sodium hydroxide aqueous solution is added thereto in drops until becoming neutral, followed by filtration to take out somewhat sticky cake, which is washed by hot water and dried. Dried crude cake is crushed, suspended in chlorobenzene of an amount ten times larger than the cake, heated under stirring, followed by hot filtration to obtain insoluble matter which is washed by-chlorobenzene and dried to obtain refined cake. 10 parts of this cake are added to 145 parts of dimethyl formamide solvent to which added are 15.8 parts of dimethyl sulphate in 2 hr. under stirring, subjected to further stirring for 2 hours at 100° C., distillating off about one half amount of dimethyl formamide under reduced pressure, cooling, and diluting the whole amount to 500 parts by way of addition of water. To the reddish liquor thus obtained are added 24 parts of zinc chloride and 30 parts of sodium chloride to effect salting out. The precipitate is filtered, dissolved in 400 parts of water, subjected to refining by use of active carbon, and further salting out. The precipitate is removed by filtration and dried.

The dyestuff thus obtained is readily soluble for water and the aqueous solution thereof is adapted to give polyacrylonitrile textile material a thick bluish red colour with fastness to light and washing.

This dyestuff indicates in acetic acid methanol solution maximum absorption of a wide range at 505 to 525 m$\mu$.

Examples 4–11

Cationic dyestuffs are obtained by way of methylation of the products shown in column A below as starting disazo dyestuff compound in a method similar to that in Example 1, and employing dimethyl sulphate as methylating agent. Thus obtained cationic dyestuffs are capable of dyeing polyacrylonitrile textile materials in such hues as shown in column B below:

| Ex. | A | B |
|---|---|---|
| 4 | [benzothiazole-C-N=N-phenyl-N(CH$_3$)-CH$_2$-]$_2$ | Bluish violet. |
| 5 | [benzothiazole-C-N=N-phenyl-N(C$_2$H$_5$)-CH$_2$-]$_2$ | Blue violet. |
| 6 | [benzothiazole-C-N=N-phenyl-N(CH$_2$-C(OH)(CH$_3$)-CH$_2$OCH$_3$)-]$_2$ | Do. |
| 7 | [H$_5$C$_2$O-benzothiazole-C-N=N-phenyl-N(C$_2$H$_5$)-CH$_2$-]$_2$ | Reddish blue. |
| 8 | [H$_5$C$_2$O-benzothiazole-C-N=N-phenyl-N(C$_2$H$_5$)-CH$_2$-CH$_2$-]$_2$ | Do. |
| 9 | [H$_5$C$_2$O-benzothiazole-C-N=N-phenyl-N(C$_2$H$_5$)-CH$_2$-]$_2$·phenyl | Blue. |
| 10 | [triazole(HC-NH, N-N)-C-N=N-phenyl-N(C$_2$H$_5$)-CH$_2$-]$_2$ | Bluish red. |
| 11 | [triazole(HOOC-C-NH, N-N)-C-N=N-phenyl-N(C$_2$H$_5$)-CH$_2$-]$_2$ | Do. |

The employment of diethyl sulphate or ethyl iodide in place of dimethyl sulphate which has been employed for the manufacture of the aforementioned dyestuffs results in producing such dyestuffs that are similar to the previous example in respect of dyeing hues and maximum absorption wave length.

*Example 12*

Monoazo compound to be obtained by coupling N·N'-diphenyl-N·N'-dimethyl ethylenediamine with diazotized 6-methoxy-2-amino-benzothiazol in equivalent molar ratio is subject to methylation by use of dimethyl sulphate of 1.5 molar ratio in the same method as in Example 1. 4.16 parts of thus obtained cationic monoazo compound are dissolved in 300 parts of water and 8.3 parts of 35% hydrochloric acid, cooled to 0° C., followed by addition thereto of diazotized product of 2.7 parts of m-aminophenol-trimethyl ammonium hydroxide, and stirring for 3 hours at a temperature of from 0° to 5° C. to effect coupling. Precipitated dyestuff is filtered, and dissolved in 1,000 parts of water containing 2 parts of sodium bisulphate, insoluble matter being removed by filtration.

To the filtrate added are 50 parts of sodium chloride to effect salting out. Precipitated dyestuff is separated by filtration, followed by addition to the filtered cake of 0.5 part of sodium bisulphate for commingly and drying. The dyestuff thus obtained dyes polyacrylonitrile textile material in olive green shade, and its main constituent is indicated by the following formula:

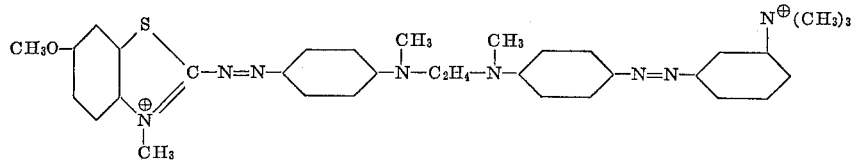

The above dyestuff indicates in methanol containing 0.1% acetic acid two maximum absorption wave lengths at 426 mμ and 625 mμ.

*Example 13*

Disazo compound which has been obtained by coupling one mole of N·N'-diphenyl-N·N' dimethyl ethylenediamine with two moles of diazotized 6-methoxy-2-amino-benzothiazol is subject to methylation by use of dimethyl sulphate in the same method as in Example 2 to obtain cationic disazo dyestuff as indicated below:

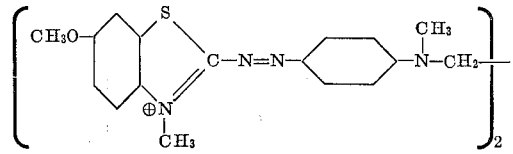

This dyestuff indicates in methanol containing 0.1% acetic acid two maximum absorption wave lengths at about 557 mμ and about 668 mμ. A mixture composed of this dyestuff and that which was obtained in Example 12 dyes polyacrylonitrile textile material an intense navy blue, black, or dark green shade with excellent fastness depending on the proportion of the two dyestuff components.

*Example 14*

4.0 parts of 1·3·3-trimethyl-2-methyleneindoline-aldehyde are dissolved in 26 parts of 32% sulphuric acid. To the solution are added 5.7 parts of N-(4-aminophenyl)-N'-phenyl-N·N'-diethyl-ethylenediamine and stirred for 20 hours at room temperature. The reaction mixture is poured into 100 parts of water containing 10 parts of sodium chloride. A small amount of zinc chloride is then added to the mixture. The resulting mixture is subjected to filtration. Filtered cake is again dissolved in 300 parts of water containing 10 parts of 1-N hydrochloric acid to which are added 1.5 parts of 1 methyl benzohydrozone thiazolone and 35 parts of 35% aqueous ferric chloride solution under vigorous stirring. The reaction mixture is stirred for 2 hours, followed by salting-out by the addition of 30 parts of sodium chloride. The precipitated cake is filtered, washed by 10% sodium chloride aqueous solution and dried at 60° C. in vacuum. The dyestuff thus obtained has the following formula:

The dyestuff dyes polyacrylonitrile textile material in dark green shade with good fastness.

*Example 15*

2.0 parts of 6-methoxy-2-amino-benzothiazol is diazotized by the similar method of Example 2 and is coupled with 2.6 parts of (2-N-ethyl-N-phenyl-amino-ethyl)-(4'-aminophenyl)-ether in 30 parts of 20% sulphuric acid. The resutling reaction mixture is then diazotized at 0–5° C. by the addition of 2.3 parts of 30% sodium nitrite aqueous solution. After the reaction is completed, the diazotized product is diluted with 10 parts of ice and 10 parts of water, and then excess nitrite is eliminated by the addition of sulfamic acid. To the resultant is added a solution of 2.0 parts of N-ethyl-N-(2-N'·N'-dimethylaminoethyl)-aniline in 20 parts of acetic acid, and the whole is stired at 0–5° C. overnight. Precipitated product is filtered, washed thoroughly with water and dried.

The dried cake and 4.0 parts of dimethyl sulphate are added to 100 parts of chlorobenzene. The mixture is heated for 2 hours at 110° C. After cooling, chlorobenzene is removed by filtration, the resulting precipitate is dissolved in hot water and reprecipitated by addition of sodium chloride.

The main constituent of the dyestuff thus obtained has the following formula and dyes polyacrylonitrile fibres an olive green shade of good fastness to light and washing.

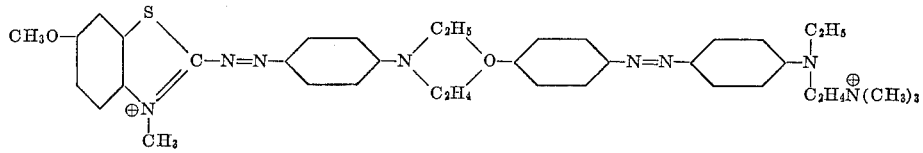

The dyestuff intermediate used for methylation in the above example may also be obtained by the condensation of equi-molecular amounts of two monoazo dyestuffs, which are obtained by the coupling of 6-methoxy-2-diazo-benzothiazol with N-ethylaniline and 4-(2'-chloroethyl-oxy)diazobenzene, with N-ethyl-N-(2-N',N' - dimethyl-aminoethyl)-aniline.

*Examples 16–43*

Dyestuffs manufactured by similar methods as described in previous examples and dyeing shades given by them to polyacrylonitrile materials are exemplified in the following:

| Ex. | Dyestuffs | Dyeing shade |
|---|---|---|
| 16 | | Blue violet. |
| 17 | | Do. |
| 18 | | Do. |
| 19 | | Do. |
| 20 | | Dark greenish blue. |
| 21 | | Dull reddish violet. |
| 22 | | Dark green. |
| 23 | | Olive green. |
| 24 | | Do. |

| Ex. | Dyestuffs | Dyeing shade |
|---|---|---|
| 25 | (structure) | Dull olive green. |
| 26 | (structure) | Blue violet. |
| 27 | (structure) | Greenish blue. |
| 28 | (structure) | Red violet. |
| 29 | (structure) | Do. |
| 30 | (structure) | Dull reddish blue. |
| 31 | (structure) | Reddish yellow. |
| 32 | (structure) | Orange. |
| 33 | (structure) | Yellow. |

| Ex. | Dyestuffs | Dyeing shade |
|---|---|---|
| 34 | (structure) | Reddish violet. |
| 35 | (structure) | Red. |
| 36 | (structure) | Reddish blue. |
| 37 | (structure) | Green. |
| 38 | (structure) | Olive green. |
| 39 | (structure) | Dull violet. |
| 40 | (structure) | Dull greenish blue. |
| 41 | (structure) | Greenish blue. |
| 42 | (structure) | Yellowish olive. |
| 43 | (structure) | Blue. |

Example 44

0.5 parts of a dyestuff mentioned in the previous examples is dissolved in 100 parts of hot water and the solution is added to 4,000 parts of cold water containing 1 part of acetic acid, 2 parts of sodium acetate, and 2 parts of non-ionic surface active agent. Cationic retardant may be further added if desired. Into the dye bath thus obtained are immersed 100 parts of polyacrylonitrile textile material at 40° C. The temperature is elevated up to 95° C. in 30 minutes and dyeing is continued for 1 hr. at 95–100° C. The dyestuff is almost entirely absorbed by textile material. Subsequently, the textile material is washed by water, subject to soaping in 5,000 parts of hot water containing 1% deteregnt for 10 minutes at 80–95° C., washed by water and dried.

Acetate-silk, wool or silk may be dyed in the similar manner.

Example 45

A printing paste for colouring is prepared according to the following recipe:

0.1–20 parts of the dyestuff in the previous examples
50 parts of glyecine A [1] (bis-2-oxyethyl thioether)
50 parts of 30% acetic acid
30 parts of 50% tartaric acid
40 parts of resorcin
60 parts of stock thickening paste (made of Nafka crystal gum, Arabo gum or starch. A mixture of 70% starch paste and 30% Nafka crystal gum paste gives good results)
Make up 1,000 parts with water.

[1] Glyecine A may be replaced by the equal amount of urea, ε-caprolactam, or methylcellosolve.

Polyacrylonitrile textile is printed by use of said printing paste, steamed for 30 minutes at 100° C. The textile is then washed through and soaped for 10 minutes at 60° C. Fast printed textile is thus obtained.

Example 46

Polyacrylonitrile-viscose-blended (70:30) textile material is printed by use of the printing paste of the following recipe:

2 parts of the dyestuff in the previous examples.
50 parts of glyecine A
50 parts of 30% acetic acid
30 parts of 50% tartaric acid
50 parts of tannin-acetic acid (1:1)
40 parts of resorcine
600 parts of stock thickening paste
Make up 1,000 parts with water.

The printed textile is then steamed, washed and soaped according to the method as in Example 45. Fast print of good fastness is obtained.

Example 47

0.5 part of dyestuff in Example 12 is added to a spinning liquor comprising 100 parts of polyacrylonitrile (M.W. ca. 60,000) dissolved in 500 parts of dimethyl formamide. The solution is ejected from nozzles into hot air to obtain thread, and the thread thus obtained is stretched at 105° C. up to eight times the initial length, washed thoroughly and dried. Dark green filaments are obtained.

What we claim is:

1. Cationic azo dyestuffs having the following formula:

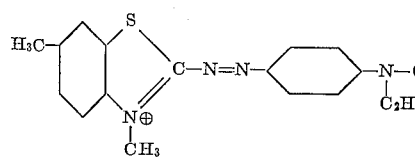

wherein R is a radical taken from the class consisting of methyl, ethyl, hydroxyethyl, hydroxypropyl, hydroxymethoxy-propyl and hydrogen; $R_1$ is a radical taken from the class consisting of methyl and ethyl; $R_2$ is a radical taken from a class consisting of hydrogen, methoxy, ethoxy, methyl, ethyl and chlorine; $R_3$ is a radical taken from the class consisting of hydrogen, methyl and chlorine; and Q is a divalent radical taken from the class consisting of ethylene, propylene, oxydiethylene, dioxytriethylene, hydroxypropylene and p-toluidino-N,N-diethylene.

2. Cationic azo dyestuffs having the following formula:

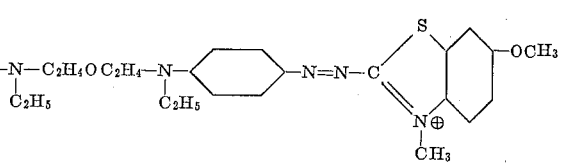

3. Cationic azo dyestuffs having the following formula:

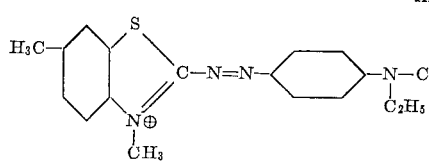

4. Cationic azo dyestuffs having the following formula:

5. Cationic azo dyestuffs having the following formula:
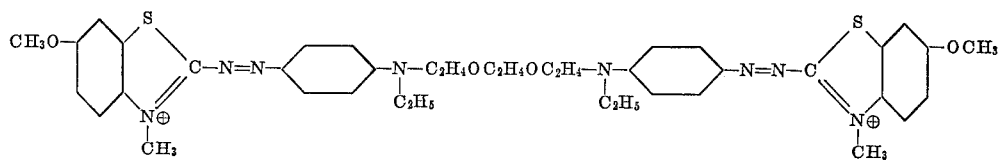
6. Cationic azo dyestuffs having the following formula:
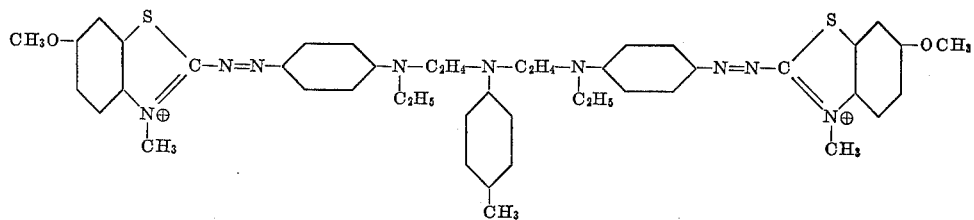
References Cited by the Examiner
UNITED STATES PATENTS
| | | | |
|---|---|---|---|
| 1,052,137 | 2/1913 | Desamari | 260—157 |
| 2,372,066 | 3/1945 | Fell | 260—157 |
| 2,792,384 | 5/1957 | Holbro | 260—158 XR |
| 2,795,577 | 6/1957 | Feeman | 260—157 XR |
| 2,875,193 | 2/1959 | Riat | 260—158 |
| 3,102,878 | 9/1963 | Baumann et al. | 260—157 XR |
CHARLES B. PARKER, *Primary Examiner.*
R. J. FINNEGAN, DONALD M. PAPUGA
*Assistant Examiners.*